US008297481B2

(12) United States Patent
Jalali et al.

(10) Patent No.: US 8,297,481 B2
(45) Date of Patent: Oct. 30, 2012

(54) DISPENSING DEVICE

(75) Inventors: Rohit Jalali, Fort Erie (CA); Christopher Vincent Tirone, East Aurora, NY (US); Theodore Watson Rich, Buffalo, NY (US); Steven A. Franz, Buffalo, NY (US); William E. Grieshober, Jr., East Amherst, NY (US); Joseph Victor Bisacca, Plano, TX (US); Lisa Augustine, Williamsville, NY (US); Kerry Marshal Chace, Dallas, TX (US); Timothy A. Falken, St. Simons Island, GA (US); David E. Moomaw, East Aurora, NY (US)

(73) Assignee: Rich Products Corporation, Buffalo, NY (US)

( * ) Notice: Subject to any disclaimer, the term of this patent is extended or adjusted under 35 U.S.C. 154(b) by 737 days.

(21) Appl. No.: 11/388,592

(22) Filed: Mar. 24, 2006

(65) Prior Publication Data

US 2007/0023456 A1 Feb. 1, 2007

Related U.S. Application Data

(60) Provisional application No. 60/704,521, filed on Aug. 1, 2005.

(51) Int. Cl.
*B67D 7/64* (2010.01)
(52) U.S. Cl. .......................... 222/391; 222/327; 222/182
(58) Field of Classification Search .................. 222/391, 222/95, 323, 327, 470, 326, 182, 325, 386, 222/472, 473, 556; 74/119, 141.5; 401/171, 401/179
See application file for complete search history.

(56) References Cited

U.S. PATENT DOCUMENTS

| 949,545 | A | * | 2/1910 | Muller | 222/390 |
| 1,576,821 | A | * | 3/1926 | Hamilton | 222/95 |
| 2,058,960 | A | * | 10/1936 | Diener | 222/95 |
| 2,243,774 | A | | 5/1941 | Resh | |
| 2,416,470 | A | | 2/1947 | Cottingham | |
| 2,533,282 | A | * | 12/1950 | Osman | 222/387 |

(Continued)

FOREIGN PATENT DOCUMENTS

DE 1140525 B 12/1962

(Continued)

OTHER PUBLICATIONS

English Translation of (M. Masselin) FR 1 519 772.*

*Primary Examiner* — Kevin P Shaver
*Assistant Examiner* — Robert Nichols, II
(74) *Attorney, Agent, or Firm* — Hodgson Russ LLP

(57) ABSTRACT

A dispensing device having a housing capable of receiving a pre-packaged charge of pre-whipped topping or icing. The housing has an inner wall with a slot formed therein for receiving a rack that is capable of rotational and translational motion within the slot. The rack has a set of gear teeth that engage with a catch on a plunger. The piston moves in the axial direction to force the pre-whipped topping or icing through the outlet in its packaging. The catch on the piston is locked in one direction and pivots in the opposite direction such that the rack engages with the piston when it moves in a first direction and the rack disengages with the piston when it is moved in a second direction opposite the first direction.

17 Claims, 6 Drawing Sheets

U.S. PATENT DOCUMENTS

| | | | | |
|---|---|---|---|---|
| 2,541,949 A | * | 2/1951 | Thacker et al. | 401/179 |
| 2,604,858 A | * | 7/1952 | Bosa | 425/288 |
| 3,193,146 A | * | 7/1965 | Isgriggs et al. | 222/82 |
| 3,833,154 A | | 9/1974 | Markowitz | |
| 3,921,858 A | | 11/1975 | Bemm | |
| 4,432,473 A | | 2/1984 | MacEwen | |
| 4,452,823 A | | 6/1984 | Connolly et al. | |
| 4,749,106 A | * | 6/1988 | von Schuckmann et al. | 222/96 |
| 4,763,815 A | * | 8/1988 | Von Schuckmann et al. | 222/96 |
| 4,778,084 A | | 10/1988 | Chen et al. | |
| 4,805,805 A | | 2/1989 | Ocheskey | |
| 4,830,231 A | | 5/1989 | Smith | |
| 4,848,598 A | * | 7/1989 | McKinney | 222/391 |
| 4,852,772 A | | 8/1989 | Ennis, III | |
| 4,869,403 A | | 9/1989 | Brüning | |
| 4,869,915 A | | 9/1989 | Inayoshi et al. | |
| 4,886,186 A | | 12/1989 | Andris | |
| 4,892,427 A | | 1/1990 | Ford | |
| 4,998,645 A | | 3/1991 | Pearson | |
| 5,154,327 A | * | 10/1992 | Long | 222/326 |
| 335,069 A | | 4/1993 | Capellan | |
| 5,356,037 A | * | 10/1994 | Harrold | 222/95 |
| 5,361,946 A | | 11/1994 | Ginther et al. | |
| 5,429,273 A | | 7/1995 | King et al. | |
| 5,955,114 A | | 9/1999 | Llanos | |
| 6,026,985 A | | 2/2000 | Elliott, Sr. | |
| 6,153,238 A | | 11/2000 | Shannon | |
| 6,158,621 A | * | 12/2000 | Keller | 222/95 |
| 6,250,505 B1 | | 6/2001 | Petit | |
| 6,267,999 B1 | | 7/2001 | Romer et al. | |
| 6,268,000 B1 | | 7/2001 | Romer | |
| 6,390,662 B1 | | 5/2002 | Henry et al. | |
| 6,460,736 B1 | | 10/2002 | D'Agostino | |
| 6,824,018 B1 | | 11/2004 | Eaddy et al. | |
| 7,011,238 B1 | | 3/2006 | Sung | |
| 2005/0045660 A1 | | 3/2005 | Ricks | |
| 2005/0139616 A1 | * | 6/2005 | Ichikawa et al. | 222/325 |
| 2005/0247738 A1 | | 11/2005 | Klein | |

FOREIGN PATENT DOCUMENTS

| | | |
|---|---|---|
| EP | 0028727 | 5/1981 |
| EP | 0869078 | 10/1998 |
| FR | 850458 | 12/1939 |
| FR | 1519772 | 4/1968 |
| FR | 2501080 | 9/1982 |
| JP | 11319669 | 11/1999 |
| WO | 99/36333 | 7/1999 |

* cited by examiner

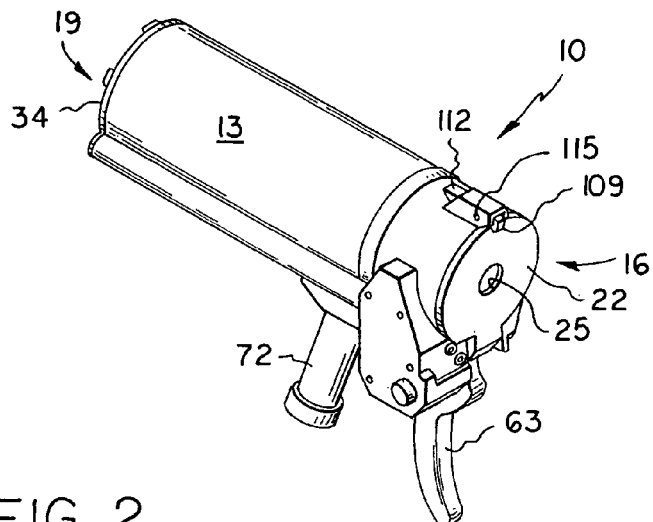
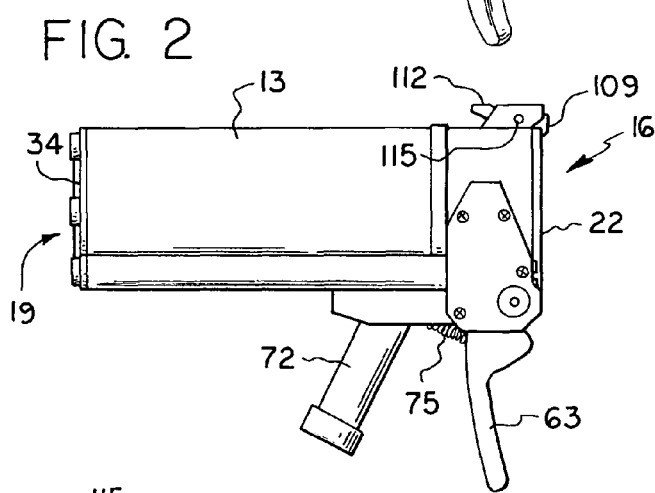
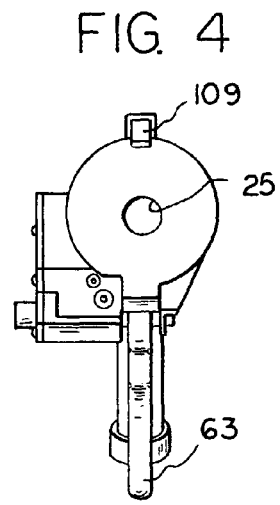
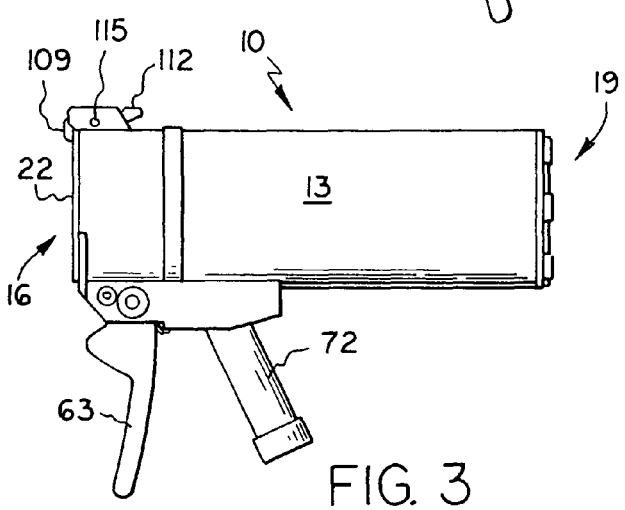
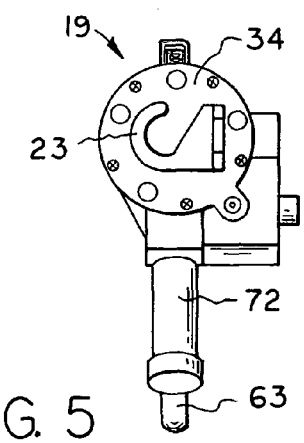

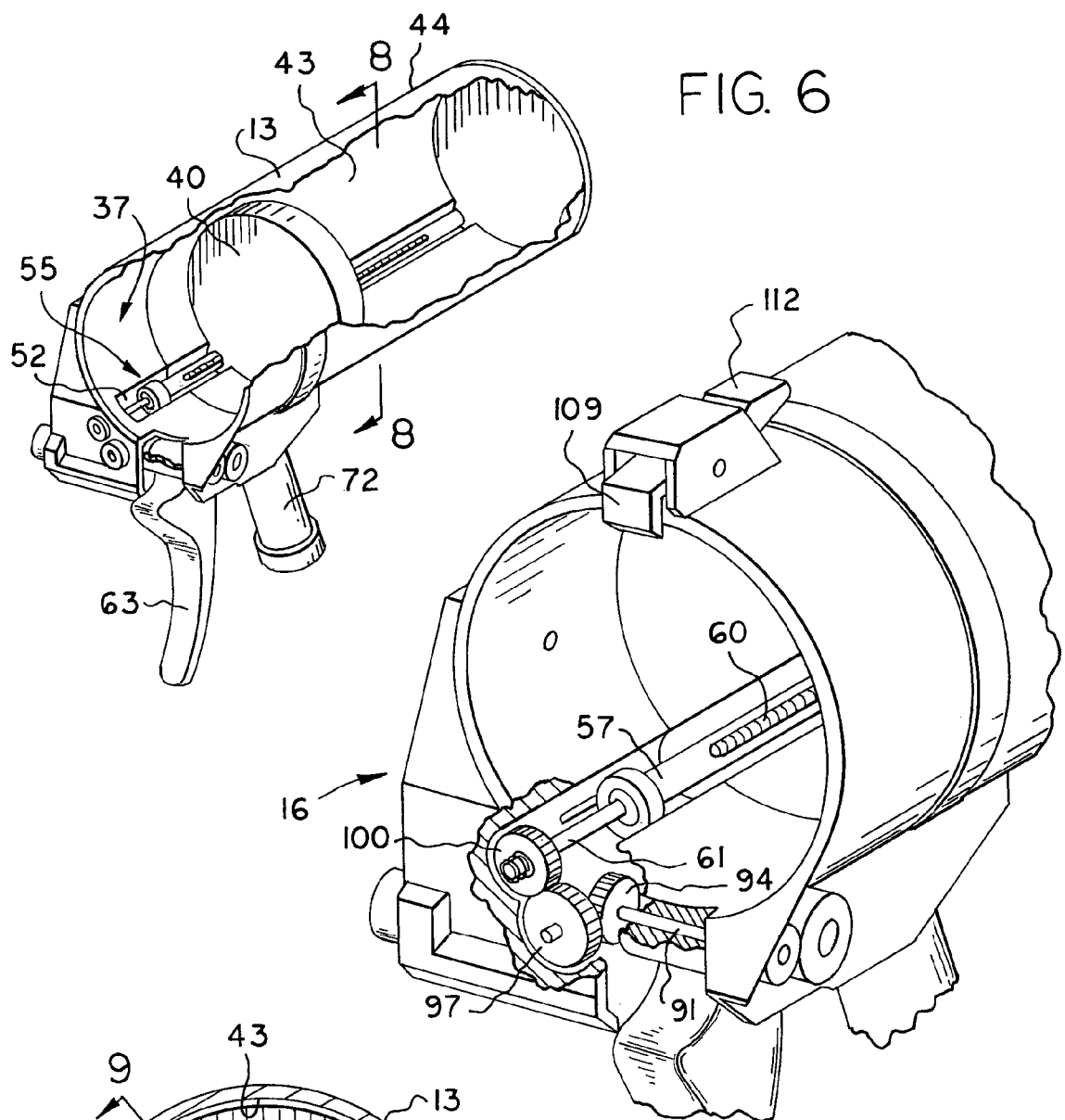
FIG. 6
FIG. 7
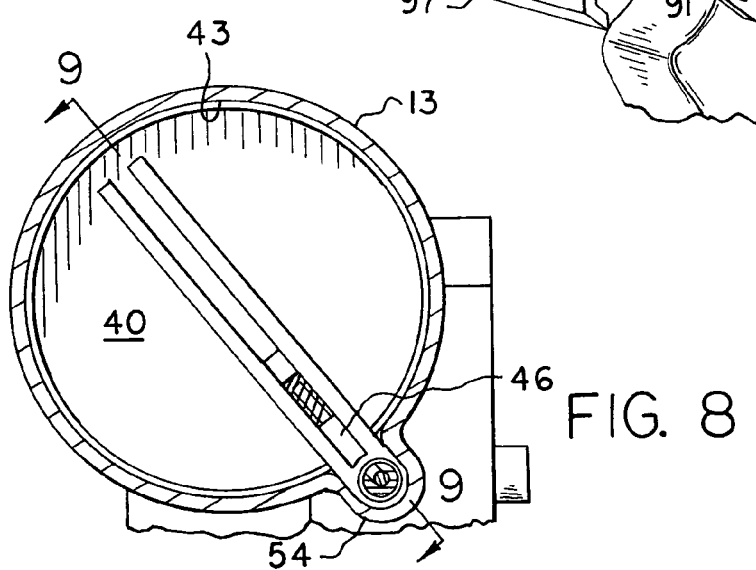
FIG. 8

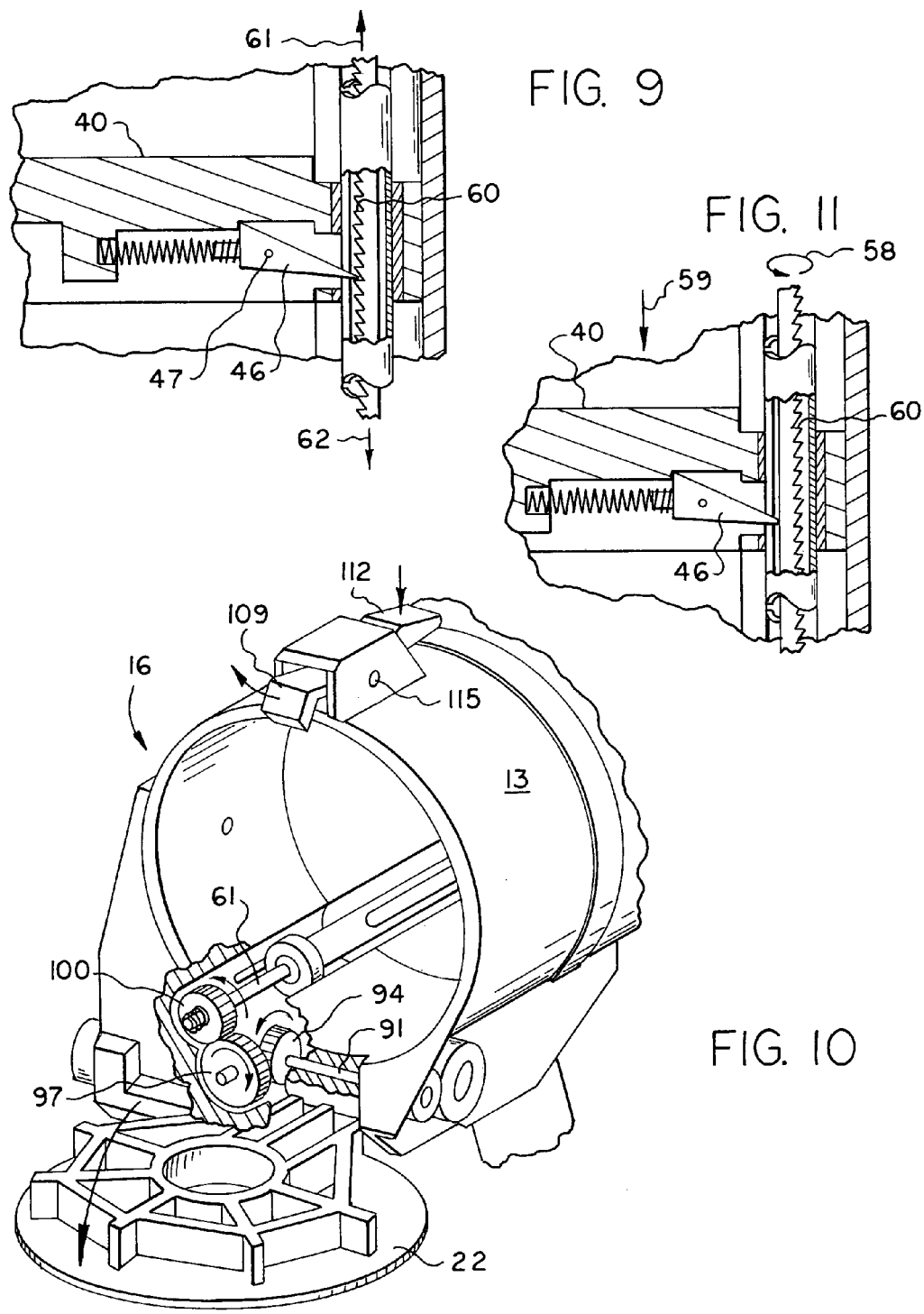

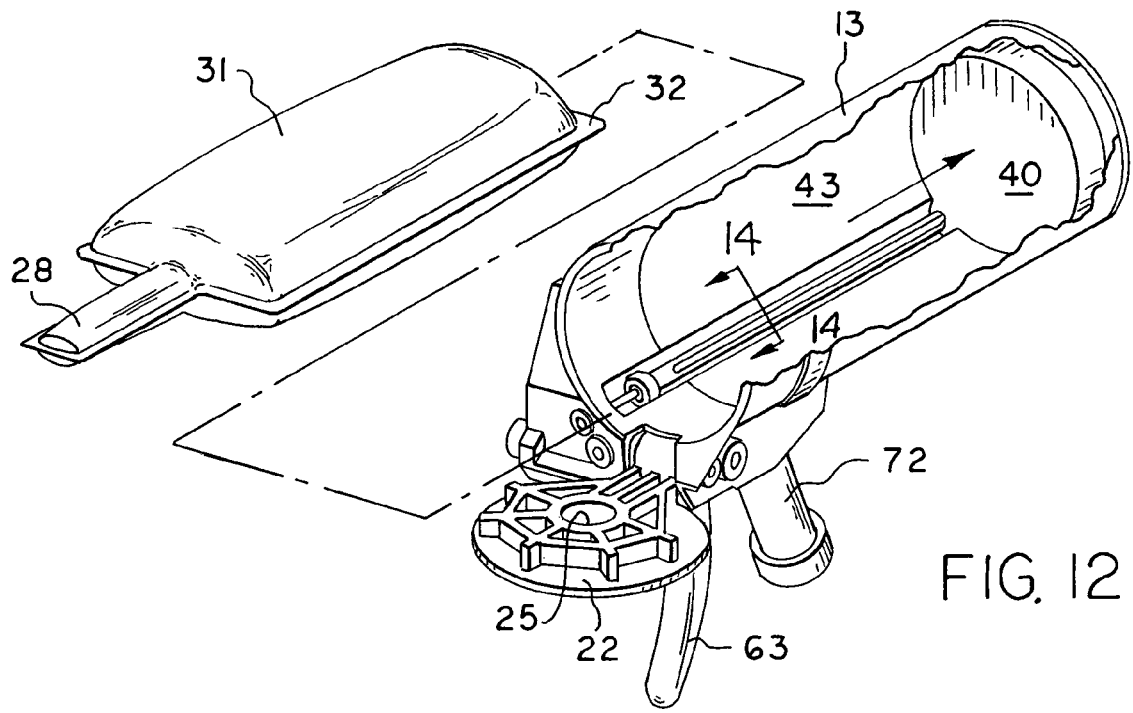
FIG. 12
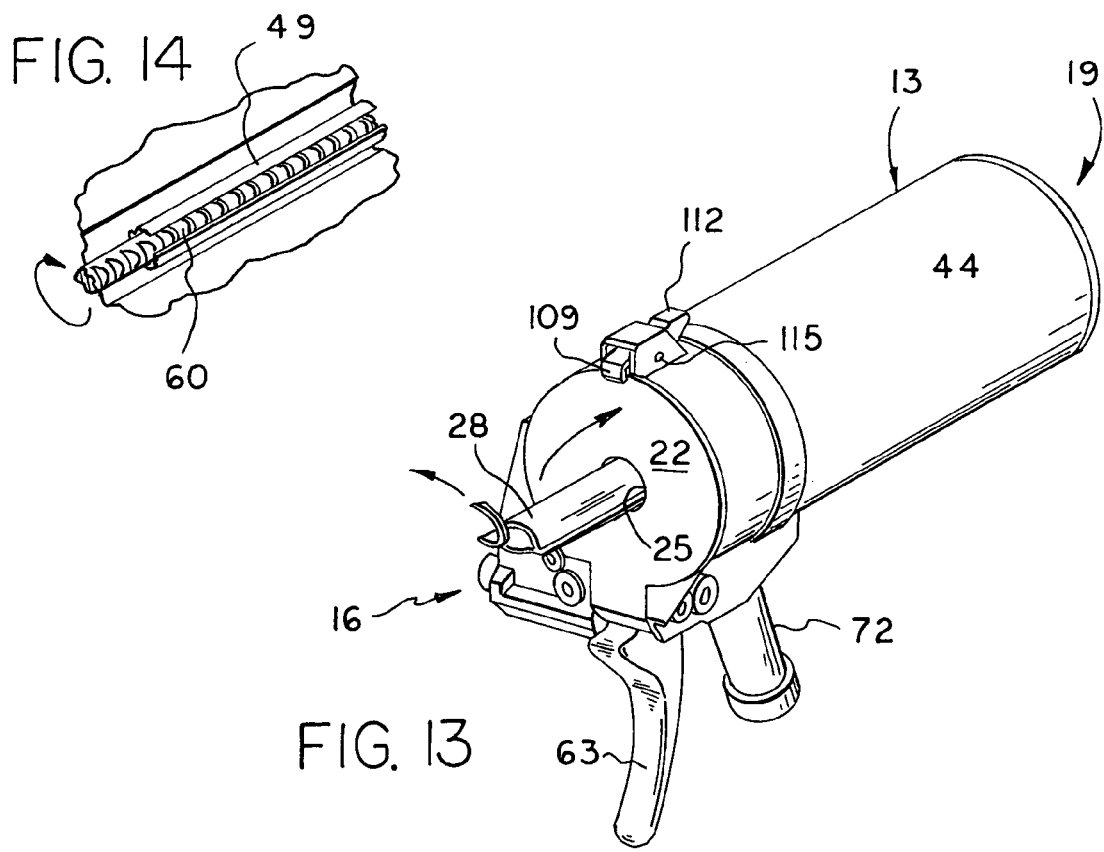
FIG. 14
FIG. 13

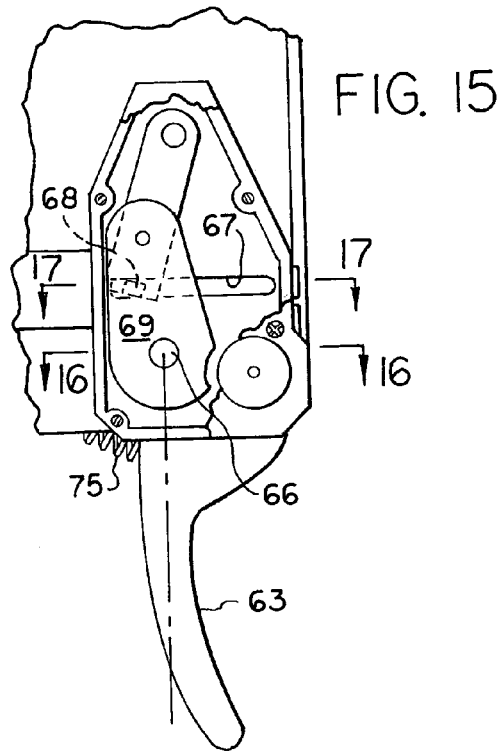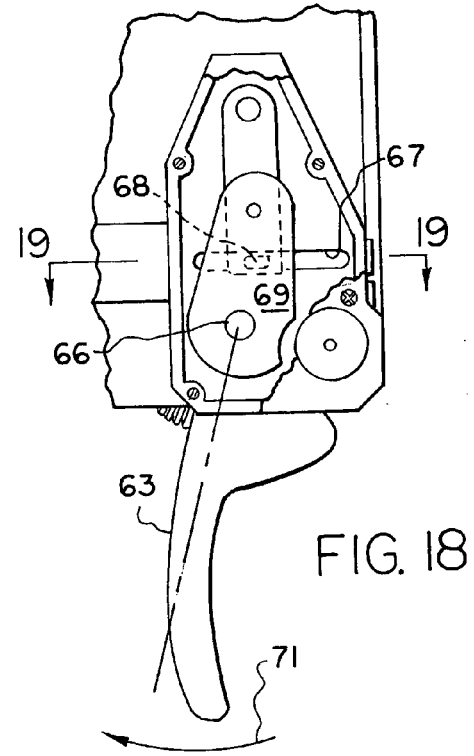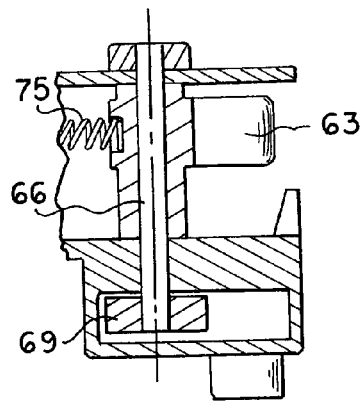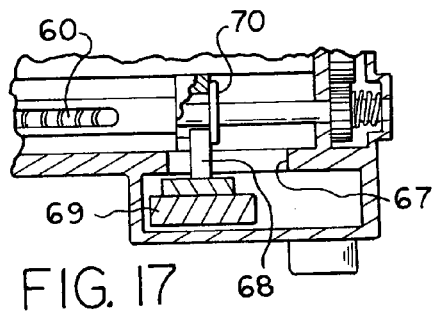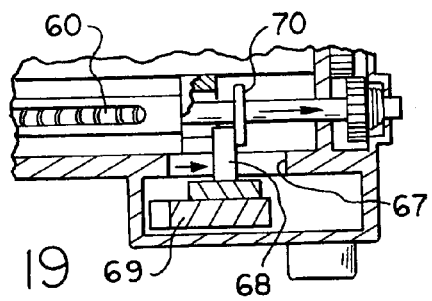

DISPENSING DEVICE

CROSS-REFERENCE TO RELATED APPLICATIONS

This application claims benefit of U.S. provisional patent application Ser. No. 60/704,521 entitled "Dispensing Device" filed on Aug. 1, 2005, and incorporated herein by reference.

BACKGROUND OF THE INVENTION

The present invention may be used for dispensing viscous materials such as paste-like extrudable materials, extrudable foams, or the like. One area where the invention has particular application is the food industry. In the food industry, icing or pre-whipped toppings are typically applied manually by means of a cone shaped flexible package containing the substance to be dispensed. As an example, pre-whipped topping is typically supplied in a sealed bag having a conical shape with the product being dispensed from the narrower end where an outlet portion is formed. The outlet portion is typically opened by cutting with a pair of scissors. Other methods for opening the bag are also suitable. Once the flexible packaging is opened at the outlet, the product is dispensed by squeezing the sides of the packaging to force the product to exit through the opening. Manual dispensing of the pre-whipped topping or icing in this manner can cause muscle fatigue in the workers which can negatively impact productivity.

There is a need for a dispensing device that is easier to operate, that can be operated with one hand, that can be stored in a limited space, and that provides cooling properties for maintaining a safe temperature for the topping. In order to maintain the physical characteristics of the dispensed product, the dispenser should not provide any force to the pre-whipped topping or icing when the unit is not dispensing.

SUMMARY OF THE INVENTION

The present invention meets the above-described need by providing a dispensing device having a housing capable of receiving a pre-packaged charge of pre-whipped topping or icing. The housing has an inner wall with a slot formed therein for receiving a rack. The rack has a set of gear teeth that engage with a catch on a plunger. The piston moves in the axial direction to force the pre-whipped topping or icing through the outlet in its packaging. The catch on the piston is locked in one direction and pivots in the opposite direction such that the rack engages with the piston when it moves in a first direction and the rack disengages with the piston when it is moved in a second direction opposite the first direction.

Rotation of the rack inside the slot moves the gear teeth to the opposite side of the slot from the catch thereby allowing the piston to be pushed back toward the end of the housing for reloading the device. In one embodiment of the invention, closing of the cover automatically causes the rack to rotate back into a position where it can engage with the rack.

BRIEF DESCRIPTION OF THE DRAWINGS

The invention is illustrated in the drawings in which like reference characters designate the same or similar parts throughout the figures of which:

FIG. 1 is a perspective view of the dispensing device of the present invention;

FIG. 2 is a right side elevational view thereof;

FIG. 3 is a left side elevational view thereof;

FIG. 4 is a front elevational view thereof;

FIG. 5 is a rear elevational view thereof;

FIG. 6 is a cutaway perspective view with the cover removed for clarity;

FIG. 7 is an enlarged perspective view of a portion of the dispensing device of the present invention;

FIG. 8 is a cross-sectional view taken along lines 8-8 of FIG. 6;

FIG. 9 is a cross-sectional view taken along lines 9-9 of FIG. 8;

FIG. 10 is an enlarged perspective view of a portion of the dispensing device of the present invention;

FIG. 11 is a cross-sectional view of a portion of the device showing the piston disengaged from the rack;

FIG. 12 is a perspective exploded view showing flexible packaging containing a supply of a pre-whipped topping;

FIG. 13 is a perspective view of the dispensing device of the present invention with the packaging for the topping loaded in the dispenser;

FIG. 14 is an enlarged perspective view of the channel in the side wall containing the rack;

FIG. 15 is an enlarged view of the trigger mechanism of the dispensing device with the cover removed for clarity;

FIG. 16 is a cross-sectional view taken along lines 16-16 of FIG. 15;

FIG. 17 is a cross-sectional view taken along lines 17-17 of FIG. 15;

FIG. 18 is a view similar to FIG. 15, with the trigger mechanism in a different position;

FIG. 19 is a cross-sectional view taken along lines 19-19 of FIG. 18;

DETAILED DESCRIPTION OF THE INVENTION

Figure 20:
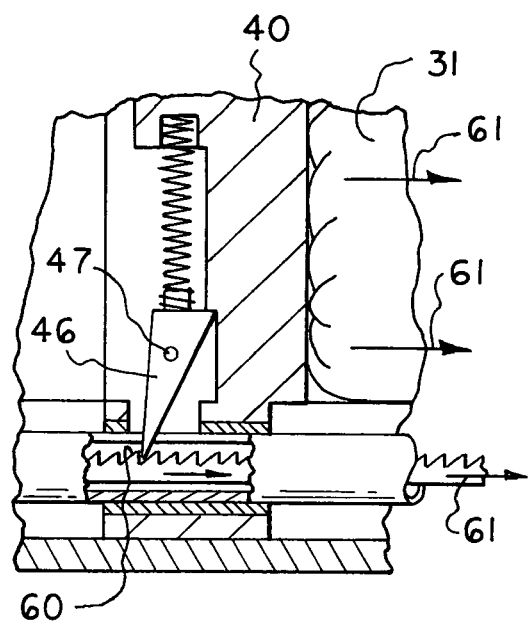
FIG. 20 is a detailed view of the piston and rack showing the movement of the piston when engaged with the rack.

Referring to FIGS. 1-21 generally and initially to FIGS. 1-5, a housing 13 has a first end 16 and a second end 19. The first end 16 is the dispensing end of the unit 10, and as will be described in greater detail below, the first end 16 may be provided with a pivoting cover 22 having an opening 25 therein. The opening 25 is sized to receive a outlet 28 (FIG. 12) operatively associated with flexible packaging 31 (FIG. 12) containing the product to be dispensed. As will be evident to those of ordinary skill in the art based on this disclosure, the outlet 28 of the packaging 31 may be provided with a dispensing tip (not shown) that is disposed inside the packaging 31 and that moves to the end of the outlet 28 to provide a passageway for the extrudable product once the dispensing begins. The cover 22 is substantially flat such that the unit is capable of being supported on a level surface from the first end 16.

The second end 19 may be provided with a substantially flat end wall 34 such that the unit may also be supported on a level surface from the second end 19. The second end 19 may also be provided with a hook 23 for hanging the unit 10 from the second end 19 for storage. The hook 23 may be relatively thin and pivotally attached at the second end 19 such that it can be folded against the end wall 34 and will not interfere when the unit 10 is supported by the second end 19.

Turning to FIG. 6, the housing 13 defines a cavity 37 that receives the flexible packaging 31 (FIG. 12). The housing 13 may be substantially cylindrical in overall shape such that it is capable of receiving a disk-like piston 40 therein. The piston 40 is capable of sliding inside the housing 13 and is supported around its edges by the inside walls 43 of the housing 13. The piston 40 and the inner walls 43 are designed with materials and clearances so that the piston 40 slides smoothly inside the housing 13 without losing alignment or binding against the inner walls 43. The force of the piston 40 against the packaging 31 causes the product to be dispensed through outlet 28 (FIG. 13) at the first end 16. The housing 13 may be constructed with inner walls 43 and an outer wall 44. A space between the walls 43, 44 can be formed and filled with materials having insulating properties for keeping materials to be dispensed either warm or cold. As an alternative the housing 13 may be formed from a solid walled cylinder constructed of a material having insulating properties. The piston 40 and lid 22 may also be formed from materials having insulating properties.

For a cylindrical housing 13, the piston 40 is round and may be provided with a thickness wide enough to provide for stable sliding against the inside walls 43. The piston 40 is provided with a catch 46 (FIGS. 8,9) that is capable of engaging with a gear rack 49 that is disposed inside the housing 13. The movement of the gear rack 49, which is described in greater detail below, causes the piston 40 to move in the axial direction with respect to the housing 13. Movement of the piston 40 in the axial direction causes the flexible packaging 31 to be compressed and the product is forced out as described above.

The gear rack 49 may be mounted on the housing 13 in a slot 52 formed by a tube-like member 54 (FIG. 8) that is attached to the housing 13 at its periphery. The slot 52 could also be integrally formed in a recess in the housing 13 itself. The slot 52 extends in the axial direction from the first end 16 to the second end 19, and the slot 52 extends in the axial direction adjacent to the inner wall 43 of the housing 13. The tube-like member 54 forming the slot 52 may be cylindrical or other suitable shape. The inside wall 43 of the housing 13 is substantially circular in cross-section except for a gap 55 where the slot 52 is formed by the tube-like member 54. The piston 40 slides inside the housing 13 against the inner walls 43, and the catch 46 extends into the slot 52 where it engages with the rack 49. The rack 49 moves back and forth inside the slot 52 as will be described in greater detail below. The dispenser 10 may be provided with a single rack 49 as shown in this example. Additional racks 49 may also be used. The reciprocating rack 49 eliminates the need for a connecting rod attached to the piston 40 and therefore reduces the space required by the unit 10.

As shown in FIG. 7, the gear rack 49 is formed by a rod 57 having a set of gear teeth 60 disposed on at least a portion of the periphery of the rod 57. In the example shown, the rod 57 is elongate and formed from a hollow cylindrical body. Other shapes may also be suitable. The rod 57 extends in the direction of the longitudinal axis of the unit 10 and may be supported from one or both ends. The rod 57 is hollow and slides over a guide pin 61. The guide pin 61 may be formed from a solid rod-like member attached at the first end 16. The guide pin 61 fits inside the rod 57 and extends for a portion of the length of the housing 13. The rod 57 slidingly engages with the pin 61 to maintain alignment of the gear rack 49 in the slot 52.

Figure 21:
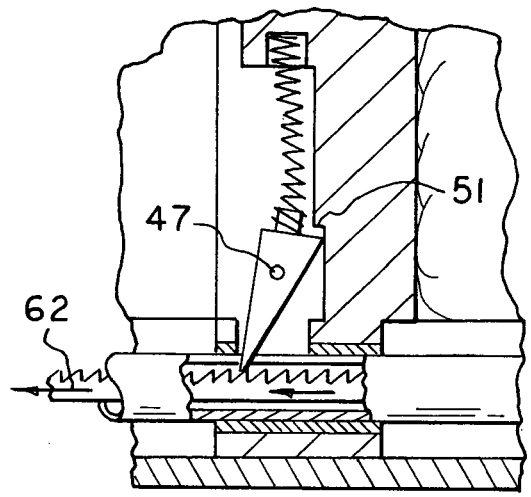
FIG. 21 is a detailed view of the piston and rack showing the catch pivoting away from the rack.

Turning to FIG. 9, the catch 46 on the piston 40 extends into the slot 52 and engages with the teeth 60 on rod 57. The catch 46 is pivotally attached to the piston 40 at pivot point 47 such that it is capable of pivoting away from the gear teeth 60 when the rack 49 moves in a particular direction. Accordingly, as best shown in FIGS. 20 and 21, when the gear teeth 60 travel in a first direction indicated by arrow 61, the catch 46 engages with the teeth 60 and the piston 40 moves in unison with the gear rack 49 in the first direction. When the gear rack 49 is moved in a second direction (indicated by arrow 62) opposite the first direction, the catch 46 pivots away from the gear teeth 60 and the gear rack 49 is capable of sliding past the piston 40 without moving the piston 40. Accordingly, during normal operation the piston 40 moves in one direction toward the dispensing end 16. Between each actuation of the trigger 63, the piston 40 is held in position by engagement of the catch 46 with teeth 60 in the rack 49. The catch 46 is arranged such that it is stopped in one direction because of engagement with a shoulder 51 (FIG. 21). Accordingly, movement of the rack 49 from left to right with respect to the figures causes the piston 40 to move and the piston 40 cannot be moved to the left with respect to the rack 49 because of the engagement of the catch 46 with the teeth 60.

The unit 10 is designed such that the piston 40 moves from the second end 19 toward the first end 16 where product is dispensed through opening 25. The gear rack 49 moves in reciprocating translatory fashion toward and away from the first end 16.

The unit 10 may be operated with one hand by means of an actuating trigger 63 (FIG. 2) that is mechanically coupled to the gear rack 49 such that rotation caused by squeezing of the trigger 63 toward a stationary handle 72 causes the gear rack 49 to move towards the first end 16 of the unit 10. In the example shown, the actuating trigger 63 is coupled to an axle 66 which rotates a link 69 to convert the rotary motion of the axle 66 into linear motion of the gear rack 49. The link 69 is connected to the rack 49 by means of element 68 which travels in slot 67 and imparts a force against a collar 70. In FIG. 15 the trigger 63 is shown in its normal position prior to actuation. As shown in FIG. 18, squeezing the trigger 63 causes it to rotate toward stationary handle 72 as indicated by arrow 71. The collar 70 is disposed around the outside of the rack 49. A bearing 71 (not shown) inside the collar 70 enables the rack 49 and guide pin 61 to rotate relative to the collar 70. The collar 70 and the rack 49 are connected such that movement of the collar 70 in the axial direction caused by the link 69 causes the rack 49 to move in unison with the collar 70 in the axial direction. The link 69 moves the rack 49 back and forth in the direction of the longitudinal axis of the unit 10.

The actuating trigger 63 is squeezed toward a stationary handle 72 in order to move the gear rack 49 in the first direction toward the first end 16 of the housing.

When the actuating handle 63 is released, the axle 66 rotates in the opposite direction by means of a biasing member such as a coil spring 75. This rotation causes the link 69 to move in the opposite direction thereby moving the gear rack 49 in the second direction.

Returning to FIG. 9, during the normal operation of the unit 10, the piston 40 moves toward the first end 16 where the product is dispensed through the nozzle 28 (FIG. 12). With each pull of the actuating trigger 63, the piston 40 advances a predetermined distance which can be adjusted as described above. As discussed above, when engaged with the gear rack 49, the piston 40 can only move in a single direction. After the piston 40 reaches the first end 16 and all of the product is dispensed, the empty package must be removed and the piston 40 must be returned to the second end 19 of the unit 10 for refilling. In order to move the piston 40 relative to the rack 49 in the second direction, the gear rack 49 must be disengaged from the catch 46 on the piston 40. In the example shown, the gear teeth 60 are disposed on one side of the cylindrical rod 57. Accordingly, rotation of the rod 57 (as indicated by arrow 58 in FIG. 11) will cause the teeth 60 to rotate out of engagement with the catch 46. Once the teeth 60 are rotated away from the catch 46, the piston 40 can be manually pushed in the direction of arrow 59 toward the second end 19 of the housing 13 for refilling the unit 10.

Turning to FIG. 10, one example for automatically rotating the teeth 60 away from the catch 46 is shown. The cover 22 is pivotally attached to the housing 13 at the first end 16, and rotating the cover 22 to open the unit 10 causes the gear rack 49 to rotate. The cover 22 is pivotally mounted on an axle 91 that is supported from the outside of the housing 13 adjacent to the first end 16. The axle 91 also has a first gear 94 mounted thereon that rotates in the same direction as the cover 22 and axle 91. The gear 94 engages with a transverse gear 97 that is mounted at an approximately ninety degree angle to the first gear 94. Accordingly, the turning of gear 94 causes rotation of gear 97 in a perpendicular plane. The transverse gear 97 is mechanically coupled to the guide pin 61 by means of a third gear 100. Accordingly, the rotation of the cover 22 from a closed to an open position causes the guide pin 61 to rotate the rack 49 by means of a set of gears 94, 97, 100. The rack 49 rotates from a position where the teeth 60 engage with the catch 46 to a position (best shown in FIG. 11) where the teeth 60 are disengaged and clear from the catch 46 thus allowing the piston 40 to slide freely in the second direction (indicated by arrow 59 in FIG. 11) toward the second end 19 of the housing 13.

The guide pin 61 has a protuberance 103 disposed thereon and extending outward. A longitudinal slot 106 formed in the gear rack 49 receives the guide pin 61. The protuberance 103 mechanically couples the guide pin 61 to the rack 49 with regard to rotation. Accordingly, rotation of the guide pin 61 by operation of the gears 94, 97, and 100 causes the rack 49 to rotate in unison by means of the protuberance 103 engaging with the side wall of the rack 49 adjacent to the slot 106.

In contrast, the longitudinal slot 106 allows the protuberance 103 to freely slide back and forth in the axial direction such that the rack 49 is capable of sliding relative to the guide pin 61 in the axial direction. As a result, the guide pin 61 and rack 49 rotate in unison but are capable of sliding relative to each other in the axial direction.

Turning to FIGS. 12-14, in order to fill the unit 10 the cover 22 is opened which causes the rack 49 to rotate away from the catch 46 on the piston 40. The piston 40 can then be pushed to the back of the housing 13. The flexible packaging 31 containing the material to be dispensed is inserted into the housing 13 and the outlet 28 is threaded through the opening 25 in the cover 22. The flexible packaging 31 may be provided with an extended portion 32 at the end opposite the outlet. The extended portion 32 provides a surface for abutting the piston 40 to provide additional stability. The cover 22 is then closed as shown in FIG. 13 and the outlet 28 is opened by means of scissors, a knife, or the like. Alternatively, the outlet 28 may be provided with a tear away feature. Once the outlet 28 is opened, material may be dispensed by squeezing the trigger 63 toward stationary handle 72.

A pivoting catch 109 may be provided adjacent the first end 16 of the housing 13 to hold the cover 22 in the closed position. The catch 109 may pivotally attached at the first end 16 such that depressing a lever 112 disposed on the opposite side of a pivot point 115 causes the catch 109 to rotate away from engagement with the cover 22. The catch 109 may be spring biased in the closed position as shown.

The unit 10 has been described in connection with a mechanical drive system for the reciprocating rack 49. It will be evident to those of ordinary skill in the art based on this disclosure that the linkage for the gear rack 49 could be driven by an electric motor or the like.

The present invention has been described in connection with a dispenser suitable for use with pre-whipped toppings or icings in the food industry. However, it is to be understood that the present invention may be used in any industry where viscous materials need to be dispensed with a hand held tool.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A dispenser, comprising:
    a housing having a cavity defined therein and having an outlet;
    a piston disposed inside the housing and having at least one retractable catch extending therefrom;
    at least one gear rack capable of translatory motion, the gear rack having teeth capable of engaging with the catch on the piston such that the piston is moved in a first direction when the rack is moved in the first direction;
    a trigger in operative relation to the gear rack such that actuation of the trigger causes the rack to move in the first direction; and a cover pivotally attached to the housing at the outlet wherein the cover is mechanically coupled to the gear rack such that opening of the cover causes the gear rack to rotate such that the teeth on the gear rack disengage from the catch on the piston so that the piston can be moved in a second direction for refilling the dispenser.

2. The dispenser of claim 1, further comprising a flexible, cylindrical-shaped bag filled with a paste-like product, the bag sized to match the inner cross-sectional area of the cavity in the dispenser, the bag having an outlet at a first end.

3. The dispenser of claim 1, wherein the outlet of the housing is disposed at a first end, the housing having a second end opposite the first end, the second end having a substantially flat surface for supporting the dispenser on the second end when the dispenser is not in use.

4. The dispenser of claim 1, wherein the outlet of the housing is recessed at the first end, the first end having a substantially planar surface disposed around the outlet for supporting the dispenser on the first end when the dispenser is not in use.

5. The dispenser of claim 1, wherein movement of the gear rack in the second direction opposite the first direction causes the catch to retract such that the piston remains substantially in place when the rack moves in the second direction.

6. The dispenser of claim 1, wherein the trigger is mechanically coupled to the gear rack by a rotating link.

7. A dispenser, comprising:
    a housing having a cavity defined therein and having an outlet;
    a piston disposed inside the housing and having at least one retractable catch extending therefrom;
    at least one gear rack capable of translatory motion, the gear rack having teeth capable of engaging with the catch on the piston such that the piston is moved in a first direction when the rack is moved in the first direction, the gear rack capable of rotating into a position where the catch does not engage with the teeth during movement of the gear rack in the first or a second direction;
    a trigger in operative relation to the gear rack such that movement of the trigger causes the rack to move in the first direction and release of the trigger causes the rack to move in the second direction opposite the first direction, wherein movement of the gear rack in the second direction causes the catch to retract such that the piston remains substantially in place when the rack moves in the second direction; and a cover pivotally attached to the housing at the outlet wherein the cover is mechanically coupled to the gear rack such that opening of the cover causes the gear rack to rotate such that the teeth on the gear rack disengage from the catch on the piston so that the piston can be moved in the second direction for refilling the dispenser.

8. The dispenser of claim 7, further comprising a flexible, cylindrical-shaped bag filled with a paste-like product, the bag sized to match the inner cross-sectional area of the cavity in the dispenser, the bag having an outlet at a first end.

9. The dispenser of claim 7, wherein the outlet of the housing is disposed at a first end, the housing having a second end opposite the first end, the second end having a substantially flat surface for supporting the dispenser on the second end when the dispenser is not in use.

10. The dispenser of claim 7, wherein the outlet of the housing is recessed at the first end, the first end having a substantially planar surface disposed around the outlet for supporting the dispenser on the first end when the dispenser is not in use.

11. The dispenser of claim 7, wherein the trigger is coupled to the gear rack by at least one pivoting link.

12. A dispenser, comprising:
- a cylindrical housing having a cavity defined therein and having a first end with outlet and having a second end disposed opposite from the first end, the housing having a longitudinal axis;
- a piston disposed inside the housing and having at least one retractable catch extending therefrom;
- at least one gear rack disposed in the cavity and wherein the gear rack moves substantially parallel to the longitudinal axis, the gear rack having a plurality of teeth capable of engaging with the catch on the piston such that the piston is moved in a first direction when the rack is moved in the first direction;
- a trigger in operative relation to the gear rack such that actuation of the trigger causes the rack to move in the first direction and release of the trigger causes the rack to move in a second direction opposite the first direction;
- wherein movement of the gear rack in the second direction causes the catch to retract such that the piston remains substantially in place when the rack moves in the second direction;
- a cover pivotally attached to the housing adjacent to the outlet, the cover having an opening defined therein for receiving a portion of a cartridge containing a viscous flowable material, the cover being mechanically coupled to the gear rack such that opening of the cover causes the gear rack to rotate such that the teeth on the gear rack disengage from the catch on the piston such that the piston can be moved in the second direction relative to the gear rack to the second end of the housing for refilling the dispenser.

13. The dispenser of claim 12, wherein the outlet of the housing is disposed at a first end, the housing having a second end opposite the first end, the second end having a substantially flat surface for supporting the dispenser on the second end when the dispenser is not in use.

14. The dispenser of claim 12, wherein the outlet of the housing is recessed at the first end, the first end having a substantially planar surface disposed around the outlet for supporting the dispenser on the first end when the dispenser is not in use.

15. The dispenser of claim 12, wherein the trigger is coupled to the gear rack by at least one pivoting link.

16. The dispenser of claim 12, wherein the housing further comprises a slot.

17. The dispenser of claim 12, wherein the gear rack is disposed in the slot.

* * * * *